United States Patent
Cha et al.

(10) Patent No.: US 9,864,124 B2
(45) Date of Patent: Jan. 9, 2018

(54) LIGHT GENERATION MEMBER INCLUDING LIGHT DIFFUSION MEMBER AND DISPLAY APPARATUS HAVING THE SAME

(71) Applicant: Samsung Display Co., Ltd., Yongin, Gyeonggi-Do (KR)

(72) Inventors: HanMoe Cha, Seoul (KR); Sanghyuck Yoon, Seoul (KR); Seung-Hwa Ha, Namyangju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 271 days.

(21) Appl. No.: 14/683,264

(22) Filed: Apr. 10, 2015

(65) Prior Publication Data
US 2016/0077271 A1    Mar. 17, 2016

(30) Foreign Application Priority Data

Sep. 12, 2014    (KR) ........................ 10-2014-0121135

(51) Int. Cl.
*G02F 1/1335*    (2006.01)
*F21V 8/00*    (2006.01)
*G02F 1/017*    (2006.01)

(52) U.S. Cl.
CPC ......... *G02B 6/0025* (2013.01); *G02B 6/0023* (2013.01); *G02B 6/0068* (2013.01); *G02B 6/0088* (2013.01); *G02F 2001/01791* (2013.01)

(58) Field of Classification Search
CPC ......... G02F 1/133603; G02F 1/133606; G02F 2001/133607; G02F 1/133609; G02F 1/133611; G02F 2001/133614; G02F 1/133615; G02F 2001/01791; G02B 6/0023; G02B 6/0025; G02B 6/0026; G02B 6/0073; G02B 6/0229
See application file for complete search history.

(56) References Cited

U.S. PATENT DOCUMENTS 8,294,168 B2    10/2012    Park et al.
2012/0250350 A1*    10/2012    Kim .................. G02F 1/133606
362/606

(Continued)

FOREIGN PATENT DOCUMENTS

CN    102937268 A    2/2013
KR    1020120075015 A    7/2012
KR    1020130046977 A    5/2013

*Primary Examiner* — Paisley L Arendt
(74) *Attorney, Agent, or Firm* — Cantor Colburn LLP

(57) ABSTRACT

A light generation member includes a light source which includes light source units which generate a first light, a light conversion member which converts the first light to a second light, and a light diffusion member which is elongated in a first direction, in which is defined first grooves respectively corresponding to the light source units, the light diffusion member diffusing the first light generated by the light source unites and providing the diffused first light to the light conversion member. The light diffusion member is between the light conversion member and the light source in a second direction crossing the first direction, and the first grooves defined in the light diffusion member are each elongated in a third direction substantially perpendicular to the first and second directions.

19 Claims, 5 Drawing Sheets

(56) References Cited

U.S. PATENT DOCUMENTS

| | | | |
|---|---|---|---|
| 2013/0128617 A1* | 5/2013 | Lee | F21S 8/00 362/611 |
| 2013/0148376 A1 | 6/2013 | Nick et al. | |
| 2013/0215645 A1 | 8/2013 | Jang et al. | |

* cited by examiner

LIGHT GENERATION MEMBER INCLUDING LIGHT DIFFUSION MEMBER AND DISPLAY APPARATUS HAVING THE SAME

This application claims priority to Korean Patent Application No. 10-2014-0121135, filed on Sep. 12, 2014, and all the benefits accruing therefrom under 35 U.S.C. §119, the contents of which are hereby incorporated by reference.

BACKGROUND

1. Field

The invention relates to a display apparatus. More particularly, the invention relates to a light generation member capable of improving uniformity of light and a display apparatus having the light generation member.

2. Description of the Related Art

Among display devices, a liquid crystal display includes a display panel having a plurality of pixels to generate an image and a backlight unit providing light to the display panel. The pixels of the display panel control a transmittance of the light provided from the backlight unit to display the image.

A light conversion member including quantum dots has been used to improve a utilization efficiency of the light provided to the display panel. The light conversion member has a bar shape and is used in an edge-illumination type backlight unit. The light conversion member converts a light provided from a light source to a white light. For instance, the light conversion member converts a blue light to the white light.

The white light generated by the light conversion member is provided to the display panel, and the pixels of the display panel display the image using the white light provided from the light conversion member.

SUMMARY

In a light conversion member, an amount of light converted by a first area of the light conversion member may be smaller than an amount of light converted by a second area of the light conversion member different from the first area. As a result, a uniformity of the light provided by the light conversion member may be degraded. Therefore, there remains a need for an improved light conversion member for which uniformity of light provided thereby is uniform.

One or more exemplary embodiment of the invention provides a light generation member capable of improving uniformity of light provided thereby.

One or more exemplary embodiment of the invention provides a display apparatus including the light generation member.

An exemplary embodiment provides a light generation member including a light source which includes a plurality of light source units which generates a first light, a light conversion member which converts the first light to a second light, and a light diffusion member which is elongated in a first direction, in which is defined a plurality of first grooves corresponding to the light source units, respectively, the light diffusion member diffusing the first light generated by the light source and providing the diffused first light to the light conversion member. The light diffusion member is between the light conversion member and the light source in a second direction crossing the first direction, and the first grooves defined in the light diffusion member are each elongated in a third direction substantially perpendicular to the first and second directions.

The first light may be a blue light and the second light is a white light.

The light source may further include a substrate on which the light source units are disposed, the substrate and the light conversion member may each be elongated in the first direction, and the light source units may be arranged in the first direction.

The light diffusion member may further include a first extension part elongated in the first direction; second extension parts of which first ends thereof are respectively connected to first and second ends of the first extension part opposite to each other in the first direction, the second extension parts respectively elongated in the second direction from the first and second ends of the first extension part; and third extension parts of which first ends thereof are respectively connected to second ends of the second extension parts opposite to the first ends thereof in the second direction, the third extension parts respectively elongated in the first direction from the second ends of the second extension parts, distal second ends of the third extension parts opposite to the first ends thereof in the first direction disposed to face each other in the first direction.

A maximum length in the first direction of the third extension parts may be smaller than a distance between a first groove closest to the first end the first extension part among the first grooves defined in the light diffusion member and the first end of the first extension part and may be smaller than a distance between a first groove closest to the second end of the first extension part among the first grooves defined in the light diffusion member and the second end of the first extension part.

Coupling grooves may be defined at first and second ends of the light diffusion member by portions of the first extension part overlapping the third extension parts in the second direction, by the second extension parts and by the third extension parts, respectively, and opposing first and second ends of the light conversion member may be respectively disposed into the coupling grooves defined at the first and second ends of the light diffusion member.

The first grooves defined in the light diffusion member may be recessed by a predetermined depth from a front surface of the first extension part, the front surface facing the light conversion member, toward a rear surface of the first extension part, the rear surface opposite to the front surface of the first extension part.

The light diffusion member may further include defined therein a second groove recessed by a predetermined depth from the rear surface of the first extension part toward the front surface of the first extension part and in which the light source units are disposed. The second groove may be elongated in the first direction and recessed by the predetermined depth such that the first grooves defined in the light diffusion member do not meet the second groove defined in the light diffusion member.

Each of the first grooves defined in the light diffusion member may include a low point at a maximum distance from the front surface of the first extension part and two inclination surfaces forming a predetermined inclination angle with respect to a plane of the front surface of the first extension part.

The inclination surfaces may extend from the low point to the front surface of the first extension part and form a first angle with respect to a first reference line, the first reference line defined as an imaginary line parallel to the second direction and passing through the low point.

The first angle may be from about 30 degrees to about 75 degrees.

Each of the first grooves defined in the light diffusion member may be recessed to have a concave shape extended from a front surface of the light diffusion member, the front surface facing the light conversion member, toward a rear surface of the light diffusion member, the rear surface opposite to the front surface of the light diffusion member.

An exemplary embodiment provides a display apparatus including a display panel which displays an image using a light, a light source which includes a plurality of light source units which generates a first light and is arranged in a first direction, a light conversion member which is elongated in the first direction and converts the first light to the light used by the display panel to display the image, a light diffusion member which is elongated in the first direction, in which is defined a plurality of first grooves respectively corresponding to the light source units, the light diffusion member diffusing the first light and providing the diffused first light to the light conversion member, and a light guide plate which guides the converted light from the light conversion member to the display panel. The light diffusion member is between the light conversion member and the light source in a second direction crossing the first direction. The light conversion member faces a light incident side surface of the light guide plate, and the first grooves defined in the light diffusion member are each elongated in a third direction substantially perpendicular to the first and second directions.

According to one or more exemplary embodiment of the invention discussed above, uniformity of the light generated and provided by the light generation member and used in the display apparatus may be improved.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
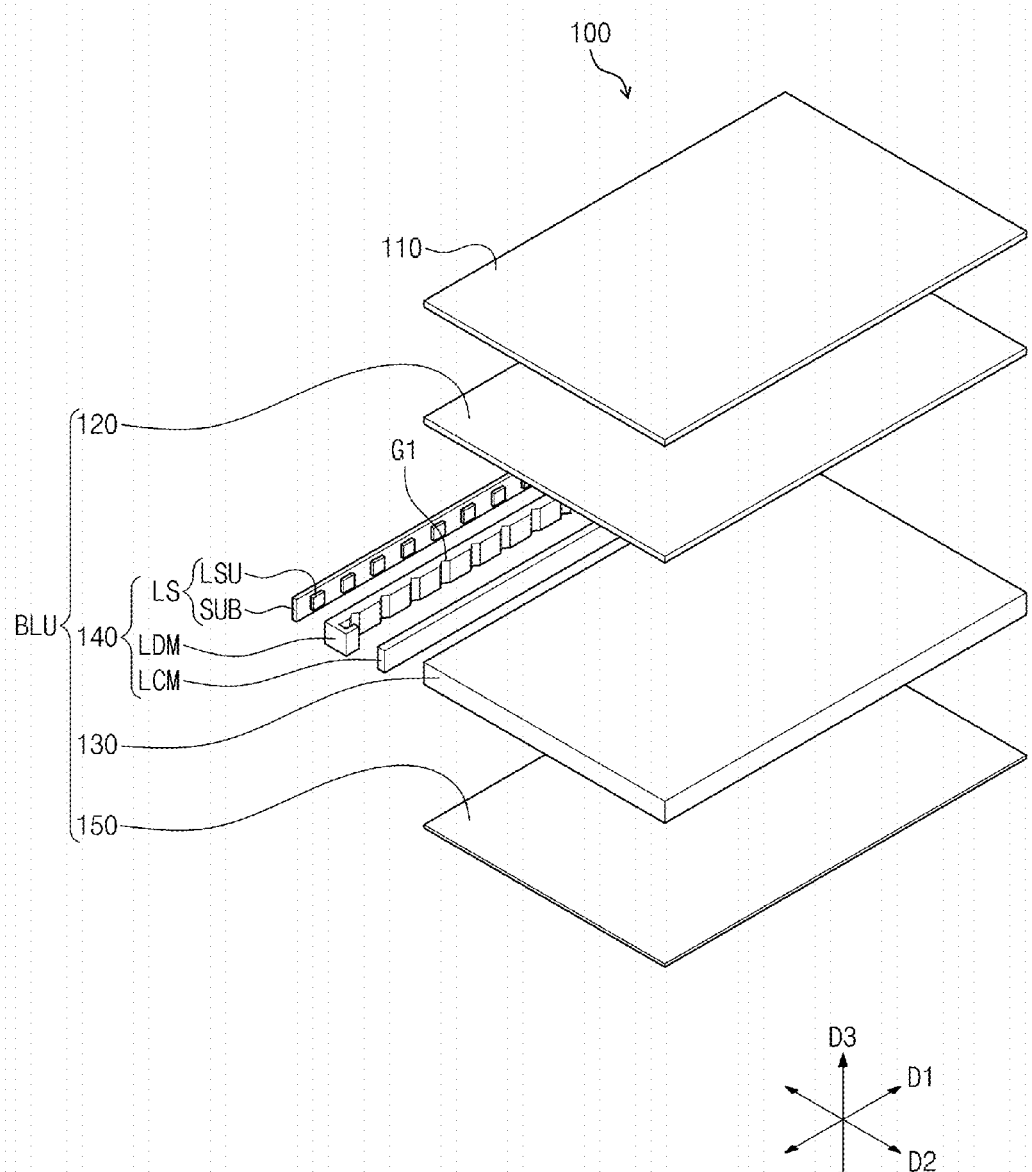
FIG. 1 is an exploded perspective view showing an exemplary embodiment of a display apparatus including a light generation member according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing an exemplary embodiment of a display apparatus 100 including a light generation member according to the invention.

Referring to FIG. 1, the display apparatus 100 includes a display panel 110 configured to display an image using a light and a backlight unit BLU generating and providing the light to the display panel 110. The backlight unit BLU is disposed at a rear side of the display panel 110, opposed to a front (e.g., display) side of the display panel 110, and provides the light to the display panel 110.

Although not shown in figures, the display panel 110 includes a plurality of pixels configured to display the image using the light. In addition, the display panel 110 may be, but not limited to, a liquid crystal display panel including a liquid crystal layer. In an exemplary embodiment, for instance, the display panel 110 includes a first substrate on which the pixels are disposed, a second substrate facing the first substrate, and the liquid crystal layer interposed between the first substrate and the second substrate.

The backlight unit BLU may be, but not limited to, an edge-illumination type backlight unit. The backlight unit BLU includes an optical sheet 120, a light guide plate 130, a light generation member 140 and a reflection sheet 150.

Each of the display panel 110, the optical sheet 120, the light guide plate 130, the light generation member 140 and the reflection sheet 150 has a long side in a first direction D1 and has a short side in a second direction D2 crossing the first direction D1.

The light generation member 140 is disposed adjacent to a side of the light guide plate 130 in the second direction D2 to face a light incident side surface thereof. The reflection sheet 150 is disposed under the light guide plate 130 to face a rear surface thereof, and the optical sheet 120 is disposed on the light guide plate 130 to face a light emitting (e.g., front) surface thereof. The display panel 110 is disposed on the optical sheet 120 in a direction in which light is emitted from the optical sheet 120.

The light generation member 140 generates the light to be provided to the display panel 110. The light generated by the light generation member 140 is provided to the light incident side surface of the light guide plate 130 in the second direction D2. The light guide plate 130 guides the light provided from the light generation member 140 to allow the light to travel in an upward direction where the display panel 110 is disposed. The reflection sheet 150 reflects the light leaked downward from the light guide plate 130 toward the upward direction.

The optical sheet 120 includes a diffusion sheet (not shown), and a prism sheet (not shown) disposed on the diffusion sheet. The diffusion sheet diffuses the light provided from the light guide plate 130.

The prism sheet condenses the light diffused by the diffusion sheet to allow the light to travel in the upward direction substantially perpendicular to a plane surface of the light guide plate 130. The light passing through the prism sheet travels in the upward direction, and thus the light may be provided to the display panel 110 with a uniform brightness.

The light generation member 140 includes a light source LS, a light diffusion member LDM and a light conversion member LCM. The light source LS, the light diffusion member LDM and the light conversion member LCM are each elongated to extend in the first direction D1.

The light diffusion member LDM and the light conversion member LCM are disposed between the light source LS and the light incident side surface of the light guide plate 130 in the second direction D2. The light conversion member LCM is disposed adjacent to the light incident side surface of the light guide plate 130 in the second direction D2. The light diffusion member LDM is disposed between the light source LS and the light conversion member LCM in the second direction D2. The light diffusion member LDM may include polymethyl methacrylate ("PMMA").

A front surface of the light diffusion member LDM faces the light conversion member LCM in the second direction D2. The light conversion member LCM is connected to the front surface of the light diffusion member LDM facing the light conversion member LCM in the second direction D2, and the light source LS is disposed at a rear surface of the light diffusion member LDM, which is opposite to the front surface of the light diffusion member LDM. Further details on the above will be described later with reference to FIG. 2.

The light source LS includes a substrate SUB elongated to extend in the first direction D1, and a plurality of light source units LSU mounted on the substrate SUB. The light source units LSU may be arranged in the first direction D1 at regular intervals. The light source units LSU may generate a first light having a predetermined color. In an exemplary embodiment, for instance, the light source units LSU may be a blue light emitting diode ("LED") generating a blue light. That is, the first light may be the blue light.

The light diffusion member LDM includes defined therein a plurality of first grooves G1 elongated to extend in a third direction D3 substantially perpendicular to both the first direction D1 and the second direction D2. The first grooves G1 are disposed at the front surface of the light diffusion member LDM. The first grooves G1 are arranged in the first direction D1 at regular intervals. The first grooves G1 are disposed to correspond to the light source units LSU, respectively. That is, the first grooves G1 and the light source units LSU may be aligned in the second direction D2.

The first light generated by the light source units LSU of the light generation member 140 is provided to the light diffusion member LDM. The light diffusion member LDM diffuses the first light provided from the light source units LSU and provides the diffused light to the light conversion member LCM. Further details on the above will be described later with reference to FIG. 5.

The light conversion member LCM converts the first light provided from the light diffusion member LDM to a second light, and may transmit an unconverted portion of the first light. The second light generated by the light conversion member LCM is provided to the light guide plate 130. The transmitted unconverted portion of the first light may also be provided to the light guide plate 130. That is, while the first light is initially generated by the backlight unit BLU, the light provided from the backlight unit BLU to the light guide plate 130 is the second light. The second light may be a white light including the light generated by the light conversion member LCM and/or the unconverted portion of the first light transmitted through the light conversion member LCM. The second light is guided to the upward direction (e.g., toward the display panel 110) by the light guide plate 130.

Figure 2:
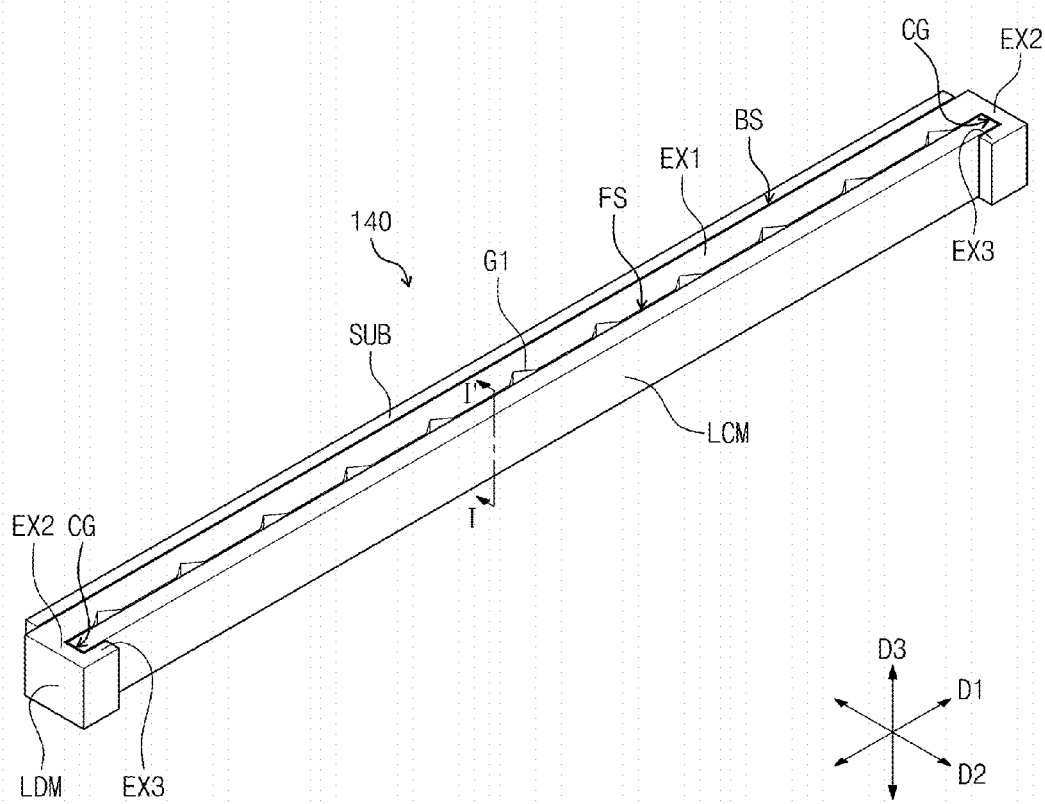
FIG. 2 is a perspective view showing an exemplary embodiment of a coupled state of the light generation member shown in FIG. 1.

FIG. 2 is a perspective view showing an exemplary embodiment of a coupled state of the light generation member shown in FIG. 1.

Referring to FIG. 2, the light diffusion member LDM includes a first extension part EX1 elongated to extend in the first direction D1, second extension parts EX2 respectively connected to opposing ends of the first extension part EX1 in the first direction D1 and elongated to extend in the second direction D2, and third extension parts EX3 respectively connected to distal ends of the second extension parts EX2 and elongated to extend in the first direction D1.

In detail, first ends of the second extension parts EX2 are respectively connected to the opposing ends of the first extension part EX1 in the second direction D2. Second ends of the second extension parts EX2 opposing the first ends thereof in the second direction D2 are respectively connected to first ends of the third extension parts EX3 corresponding thereto. First ends of the extension parts EX3 are respectively connected to the second ends of the second extension parts EX2. The third extension parts EX3 are elongated to extend in the first direction D1 such that distal second ends of the third extension parts EX3 face each other along the first direction.

A front surface FS of the first extension part EX1 is disposed to face the light conversion member LCM in the second direction D2. That is, the front surface FS of the first extension part EX1 is disposed to face a light incident side surface of the light guide plate 130. The first grooves G1 are defined at the front surface FS of the first extension part EX1. The first grooves G1 are recessed from a plane of the front surface FS to extend a predetermined depth from the front surface FS of the first extension part EX1 toward a rear surface BS of the first extension part EX1. The rear surface BS of the first extension part EX1 is opposite to the front surface FS of the first extension part EX1.

The third extension parts EX3 are elongated to extend in the first direction D1 to have respective maximum lengths in the first direction D1 taken from first direction ends of the first extension part EX1, smaller than a length between a first groove G1 disposed closest to a first end of the first extension part EX1 among the first grooves G1 and the first end of the first extension part EX1 and smaller than a length between a first groove G1 closest to a second end of the first extension part EX1 among the first grooves G1 and the second end of the first extension part EX1.

Due to the structure of the light diffusion member LDM, coupling grooves CG are formed by a portion of the first extension part EX1, which is overlapped with respective third extension parts EX3 in the second direction D2, a respective second extension part EX2, and the respective third extension part EX3. Predetermined portions at opposing first direction D1 ends of the light conversion member LCM are respectively inserted into the coupling grooves CG. Thus, the light conversion member LCM is easily coupled to the light diffusion member LDM in a coupled state of the light generation member 140.

The substrate SUB of the light source LS is disposed on the rear surface BS of the first extension part EX1. Hereinafter, further details on the structure of the light source LS disposed on the rear surface BS of the first extension part EX1 will be described.

Figure 3:
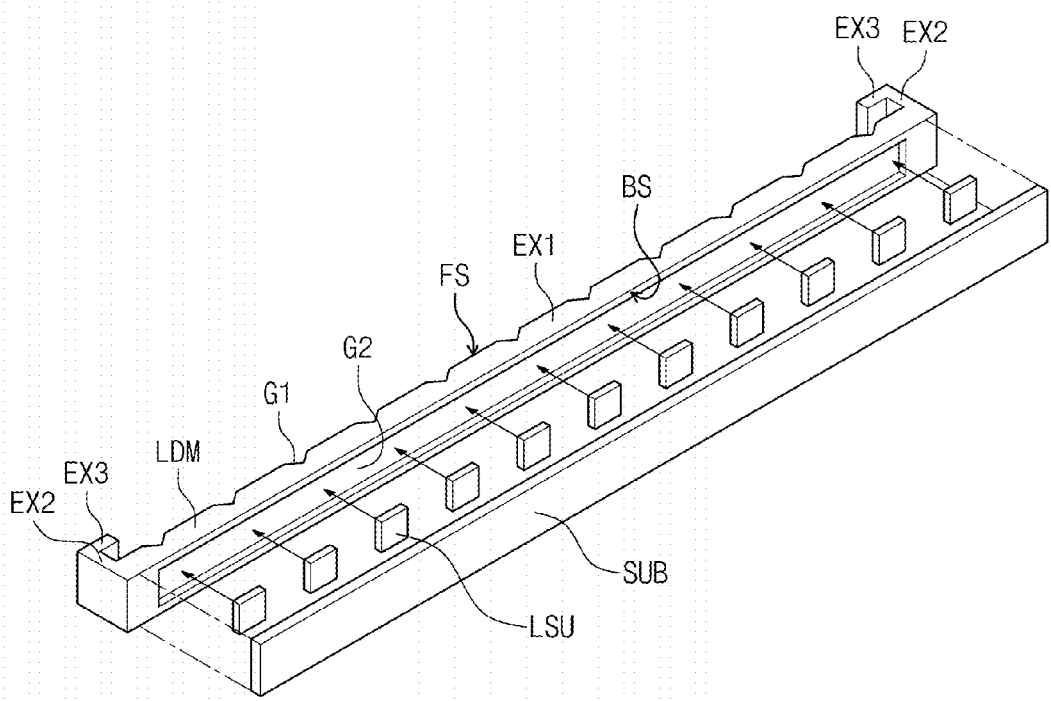
FIG. 3 is an exploded perspective view showing an exemplary embodiment of a rear surface of a light diffusion member shown in FIG. 2.
Figure 3:
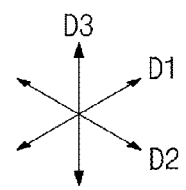

FIG. 3 is an exploded perspective view showing an exemplary embodiment of a rear surface of the light diffusion member shown in FIG. 2. For the sake of clarity in explanation, the substrate SUB and the light source units LSU shown in FIG. 3 are separated from each other.

Referring to FIG. 3, a second groove G2 is defined at the rear surface BS of the first extension part EX1. The second groove G2 is recessed from a plane of the rear surface BS with a predetermined depth from the rear surface BS of the first extension part EX1 toward the front surface FS of the first extension part EX1. The second groove G2 has the predetermined depth such that the second groove G2 does not make contact with or extend through a thickness of the first extension part EX to any of the first grooves G1. The second groove G2 is elongated to extend in the first direction D1. The substrate SUB is disposed on the rear surface BS of the first extension part EX1 and the light source units LSU are inserted into the second groove G2.

Figure 4:
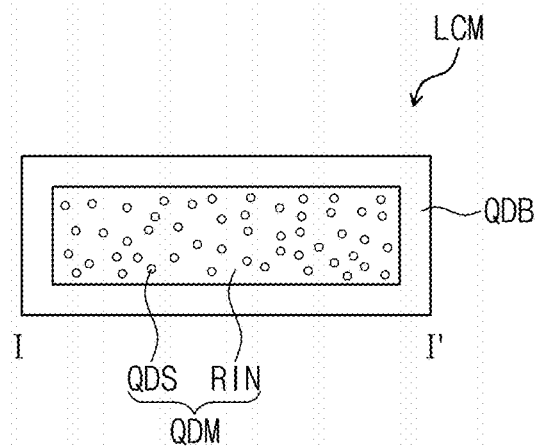
FIG. 4 is a cross-sectional view showing an exemplary embodiment of a light conversion member taken along line I-I' of FIG. 2.

FIG. 4 is a cross-sectional view showing an exemplary embodiment of a light conversion member taken along line I-I' of FIG. 2.

Referring to FIG. 4, the light conversion member LCM includes a quantum dot bar QDB, and a quantum dot member QDM accommodated in the quantum dot bar QDB. The quantum dot member QDM includes a resin RIN, and a plurality of quantum dots QDS distributed in the resin RN.

The quantum dot bar QDB may include glass. The quantum dot bar QDB is elongated to extend in the first direction D1. The quantum dot bar QDB includes defined therein an inner space elongated to extend in the first direction D1 to accommodate the first direction D1 elongated quantum dot member QDM therein.

In an exemplary embodiment of a manufacturing method of the light conversion member LCM, the light conversion member LCM is provided with the quantum dot bar QDB having the above-described inner space and elongated to extend in the first direction D1. One end of the quantum dot bar QDB is opened in the first direction D1 to expose the inner space and the other (opposing) end of the quantum dot bar QDB is closed in the first direction D1 such that the inner space is not exposed at the opposing end. The resin RN in which the quantum dots QDS are distributed is disposed in the inner space of the quantum dot bar QDB through the opened one end to fill the inner space, and the resin RN is cured. The initially opened one end of the quantum dot bar QDB is sealed by a sealing member (not shown), to thereby manufacture the light conversion member LCM including the quantum dot member QDM accommodated in the quantum dot bar QDB.

The quantum dot member QDM receives the first light generated by the light source LS through the light diffusion member LDM and converts the first light to the second light. That is, the quantum dot member QDM converts the blue light generated by the light source LS to the white light.

In order to generate the white light, the quantum dot member QDM includes quantum dots having different dimensions or sizes in consideration of the light source LS. In an exemplary embodiment, for instance, where the light source LS generates the blue light, the quantum dot member QDM may include first quantum dots QDS having a size that allows the quantum dot member QDM to absorb a light within a blue wavelength range and to emit a light within a green wavelength range and second quantum dots QDS having a size that allows the quantum dot member QDM to absorb the light within the blue wavelength range and to emit a light within a red wavelength range.

The quantum dots QDS of the quantum dot member QDM absorb the blue light provided from the light source LS and convert the blue light to the light having the green light wavelength range and/or the red light wavelength range. In addition, a portion of the blue light may not be absorbed by the quantum dots QDS and may be transmitted through the quantum dot member QDM. Accordingly, the lights having the blue, green and red light wavelength ranges transmitted through the quantum dot member QDM may be mixed with each other in the quantum dot member QDM to generate the white light finally generated in the quantum dot member QDM.

Figure 5:
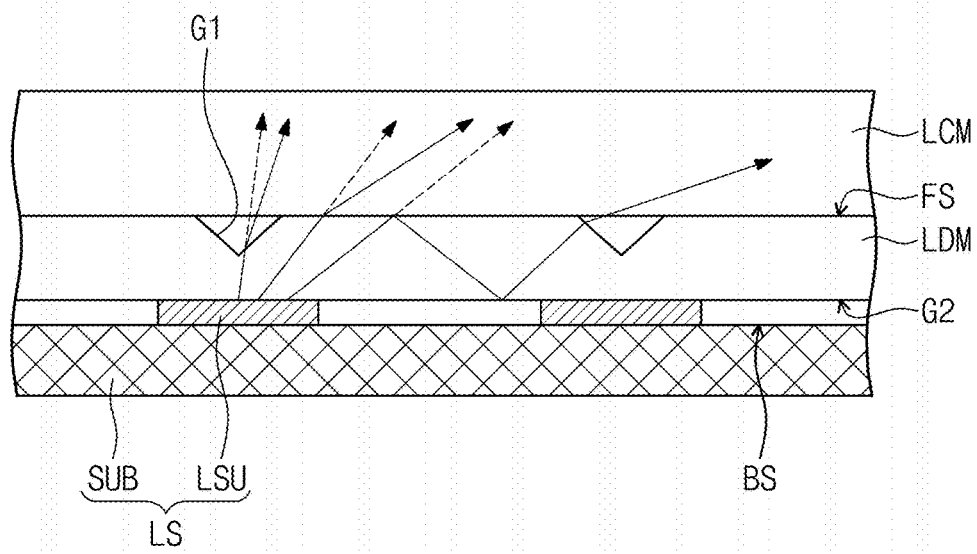
FIG. 5 is a cross-sectional view showing a light path in an exemplary embodiment of a light generation member.

FIG. 5 is a cross-sectional view showing a light path in an exemplary embodiment of a light generation member.

Referring to FIG. 5, as described earlier, the first grooves G1 are disposed to correspond to the light source units LSU, respectively. The light source units LSU are inserted into the second groove G2 defined recessed from the rear surface BS. The first light generated by the light source units LSU is totally reflected by and within the light diffusion member LDM to be therefore diffused by the light diffusion member LDM.

Where the light diffusion member LDM is omitted from the light generation member 140, the first light generated by the light source units LSU may be provided to the light conversion member LCM with a predetermined incident angle. Without the light diffusion member LDM, an amount of the first light provided to a first area of the light conversion member LCM, which corresponds to a center area between light source units LSU adjacent to each other, may be smaller than an amount of the first light provided to a second area of the light conversion member LCM, which corresponds to an area of the light conversion member LCM except for the first area. That is, without the light diffusion member LDM, light from the light source units LSU may not be uniformly provided to the light conversion member LCM.

Thus, where the light diffusion member LDM is omitted from the light generation member 140, an amount of the light converted by the first area of the light conversion member LCM may be smaller than an amount of the light converted by the second area of the light conversion member LCM. As a result, a uniformity of the second light generated by the light conversion member LCM may be degraded.

However, according to one or more exemplary embodiment, the first light generated from the light source units LSU is totally reflected by the light diffusion member LDM and the first grooves G1 of the light diffusion member LDM, and thus the totally-reflected first light has the light path shown in FIG. 5.

For the convenience of explanation, three light paths are shown in FIG. 5. In FIG. 5, a dotted line shows the light path of the first light where the light diffusion member LDM is omitted, and a solid line shows the light path of the first light totally reflected by the light diffusion member LDM.

As shown in FIG. 5, the first light indicated by the solid line while being provided to the light conversion member LCM is more diffused (e.g., a light path thereof is further changed from an initial emission path) than the first light indicated by the dotted line while being provided to the light conversion member LCM. That is, when the light diffusion member LDM applied to the light generation member 140 includes the first grooves G1, the first light is totally reflected by the light diffusion member LDM and the first grooves G1 of the light diffusion member LDM to be diffused thereby.

As described above, since the first light is provided to the light conversion member LCM after being diffused by the light diffusion member LDM, the uniformity of the second light generated by the light conversion member LCM is improved.

Consequently, the light generation member 140 including the light diffusion member LDM and the display apparatus 100 including the light generation member 140 may improve the uniformity of the second light provided to a display panel of the display apparatus 100.

Figure 6:
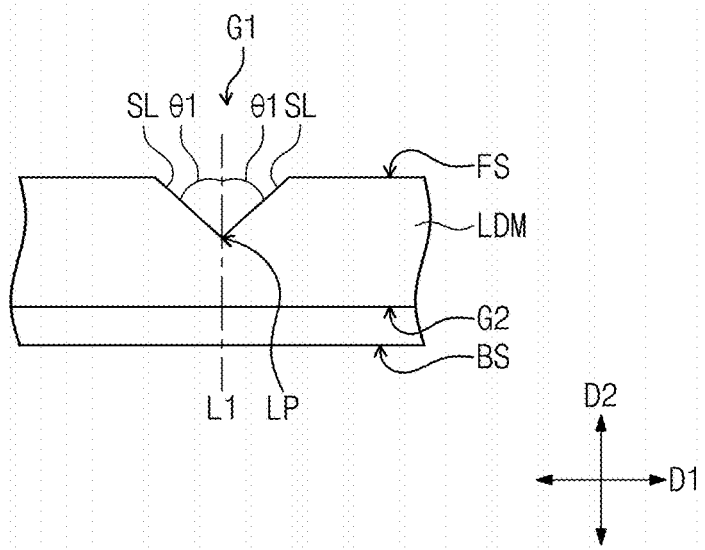
FIG. 6 is a cross-sectional view showing an inclination angle of an exemplary embodiment of a first groove of a light generation member according to the invention.

FIG. 6 is a cross-sectional view showing an inclination angle of an exemplary embodiment of a first groove of a light generation member according to the invention.

For the convenience of explanation, FIG. 6 shows only one first groove G1, but the other first grooves G1 defined in the light diffusion member LDM have the same structure as that of the first groove G1 shown in FIG. 6.

Referring to FIG. 6, the first groove G1 has a valley shape recessed from a plane of the front surface FS. The first groove G1 includes a low point LP furthest from the front surface FS of the first extension part EX1 among surfaces of the first groove G1, and two inclination surfaces SL forming a predetermined inclination angle with respect to a line normal to the plane of the front surface FS of the first extension part EX1.

Hereinafter, an imaginary line passing through the low point LP of the first groove G1 and substantially in parallel to the second direction D2 or in a direction normal to the plane of the front surface FS is referred to as a first reference line L1. The inclination surfaces SL extend from the low point LP to the front surface FS of the first extension part EX1 to be inclined at a first angle θ1 with respect to the first reference line L1.

The uniformity of the second light finally emitted from the light generation member 140 may vary depending on the first angle θ1. Table 1 below shows the uniformity of measured second light from the light generation member 140 while the first angles θ1 is variously changed. In Table 1, a cell in which the first angle θ1 is not indicated (with dash '-') represents the uniformity of the second light generated by a light generation member to which the light diffusion member LDM is not applied.

A brightness of the light is expressed in units of lux. Table 1 shows a maximum lux value LUX_Max, a minimum lux value LUX_Min, and the uniformity of the light, with respect to the first angle θ1 in degrees (°).

A percentage (%) of the uniformity is obtained by dividing the minimum lux value LUX_Min by the maximum lux value LUX_Max. The uniformity becomes higher as a deviation between the minimum lux value LUX_Min and the maximum lux value LUX_Max becomes smaller. For instance, where the brightness is constant over the entire area of the light generation member 140, the minimum lux value LUX_Min and the maximum lux value LUX_Max are equal to each other, and thus, the uniformity may be 100%.

TABLE 1

| θ1 (°) | LUX Max | LUX Min | Uniformity |
| --- | --- | --- | --- |
| 15 | 21443000 | 7907400 | 36.876% |
| 30 | 19993000 | 8290200 | 41.466% |
| 45 | 19303000 | 8093200 | 41.927% |
| 60 | 18910000 | 8941900 | 47.287% |
| 75 | 21229000 | 8062400 | 37.978% |
| — | 38450000 | 1347400 | 3.504% |

As shown in Table 1, the uniformity of the second light generated by the light generation member 140 including the light diffusion member LDM is greater than the uniformity of the second light generated by the light generation member which does not include the light diffusion member LDM.

In addition, the uniformity of the second light may vary depending on the first angle θ1 formed by the inclination surfaces SL. In one or more exemplary embodiment, the first angle θ1 may be set to an angle of about 30 degrees to about 75 degrees in order to increase the uniformity of the second light. The uniformity of the second light has the maximum value when the first angle θ1 is about 60 degrees. Thus, in an exemplary embodiment, the first angle θ1 may be set to about 60 degrees.

Figure 7:
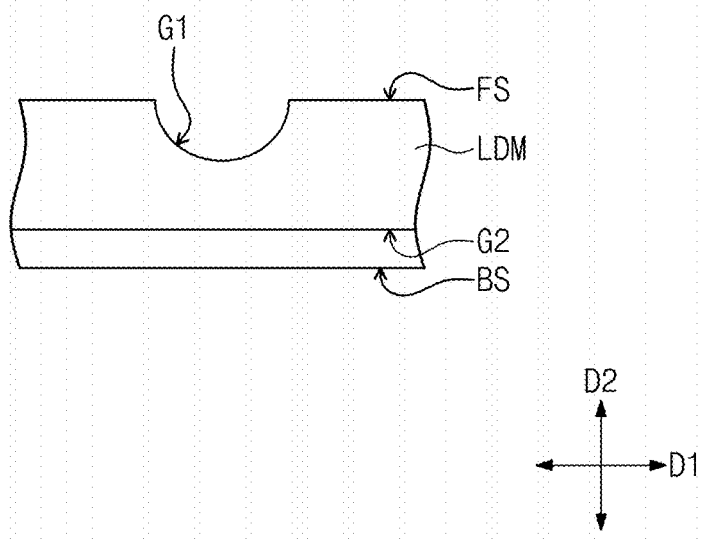
FIG. 7 is a cross-sectional view showing another exemplary embodiment of a first groove of a light generation member according to the invention.

FIG. 7 is a cross-sectional view showing another exemplary embodiment of a first groove G1 of a light generation member according to the invention.

The light generation member in FIG. 7 has substantially the same structure as that of the light generation member 140 shown in FIG. 2 except for a shape of the first groove G1.

For the convenience of explanation, FIG. 7 shows only one first groove G1 of a light diffusion member LDM. However, the light diffusion member LDM of the light generation member in FIG. 7 includes a plurality of first grooves G1 each having the same structure as that of the first groove G1 shown in FIG. 7.

Referring to FIG. 7, the first groove G1 is recessed from a plane of the front surface FS of the light diffusion member LDM toward a rear surface BS of the light diffusion member LDM to have a curved concave shape. In the light generation member including the features of FIG. 7, the first light generated by light source units LSU is totally reflected by the light diffusion member LDM and the first grooves G1 of the light diffusion member LDM to be thereby diffused by the light diffusion member LDM.

Similar to the uniformity of the second light depending on the first angle θ1 defined by the first groove G1 shown in FIG. 1, the uniformity of the second light may vary depending on a curvature of the first groove G1 shown in FIG. 7. Also similar to the light generating member explained with respect to the linearly concave first groove G1 in FIG. 6, the uniformity of the second light emitted by the light generation member which includes the light diffusion member LDM having the first groove G1 shown in FIG. 7, is greater than the uniformity of the second light in the light generation member, which does not include the light diffusion member LDM.

Accordingly, one or more exemplary embodiment of the light generation member according to the invention improves the uniformity of the second light generated thereby and emitted therefrom.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A light generation member comprising:
   a light source comprising a plurality of light source units which generates a first light;
   a light conversion member which converts the first light to a second light; and
   a light diffusion member which is elongated in a first direction, in which is defined a plurality of first grooves corresponding to the light source units, respectively, the light diffusion member diffusing the first light generated by the light source and providing the diffused first light to the light conversion member,
   wherein
   the light diffusion member is between the light conversion member and the light source in a second direction crossing the first direction,
   the first grooves defined in the light diffusion member are each elongated in a third direction substantially perpendicular to the first and second directions, and
   the light diffusion member comprises:
   a first extension part elongated in the first direction;
   second extension parts of which first ends thereof are respectively connected to first and second ends of the first extension part opposite to each other in the first direction, the second extension parts respectively elongated in the second direction from the first and second ends of the first extension part; and
   third extension parts of which first ends thereof are respectively connected to second ends of the second extension parts opposite to the first ends thereof in the second direction, the third extension parts respectively elongated in the first direction from the second ends of the second extension parts, distal second ends of the third extension parts opposite to the first ends thereof in the first direction disposed to face each other in the first direction.

2. The light generation member of claim 1, wherein the first light is a blue light and the second light is a white light.

3. The light generation member of claim 1, wherein the light source further comprises a substrate on which the light source units are disposed, the substrate and the light conversion member each elongated in the first direction and the light source units arranged in the first direction.

4. The light generation member of claim 1, wherein a maximum length in the first direction of the third extension parts is smaller than a distance between a first groove closest to the first end of the first extension part among the first grooves defined in the light diffusion member and the first end of the first extension part and smaller than a distance between a first groove closest to the second end of the first extension part among the first grooves defined in the light diffusion member and the second end of the first extension part.

5. The light generation member of claim 1, wherein
   coupling grooves are defined at first and second ends of the light diffusion member by portions of the first extension part overlapping the third extension parts in the second direction, by the second extension parts and by the third extension parts, respectively, and
   opposing first and second ends of the light conversion member are respectively disposed into the coupling grooves defined at the first and second ends of the light diffusion member.

6. The light generation member of claim 1, wherein the first grooves defined in the light diffusion member are recessed by a predetermined depth from a front surface of the first extension part, the front surface facing the light conversion member, toward a rear surface of the first extension part, the rear surface opposite to the front surface of the first extension part.

7. The light generation member of claim 6, wherein the light diffusion member further comprises defined therein a second groove recessed by a predetermined depth from the rear surface of the first extension part toward the front surface of the first extension part and in which the light source units are disposed, the second groove elongated in the first direction and recessed by the predetermined depth such that the first grooves defined in the light diffusion member do not meet the second groove defined in the light diffusion member.

8. The light generation member of claim 6, wherein each of the first grooves defined in the light diffusion member comprises:
   a low point at a maximum distance from the front surface of the first extension part; and
   two inclination surfaces forming a predetermined inclination angle with respect to a plane of the front surface of the first extension part.

9. The light generation member of claim 8, wherein the inclination surfaces extend from the low point to the front surface of the first extension part and form a first angle with respect to a first reference line, the first reference line defined as an imaginary line parallel to the second direction and passing through the low point.

10. The light generation member of claim 9, wherein the first angle is from about 30 degrees to about 75 degrees.

11. The light generation member of claim 1, wherein each of the first grooves defined in the light diffusion member is recessed to have a concave shape extended from a front surface of the light diffusion member, the front surface facing the light conversion member, toward a rear surface of the light diffusion member, the rear surface opposite to the front surface of the light diffusion member.

12. The light generation member of claim 1, wherein the light diffusion member comprises polymethyl methacrylate.

13. A display apparatus comprising:
- a display panel which displays an image using a light;
- a light source comprising a plurality of light source units which generates a first light and is arranged in a first direction;
- a light conversion member which is elongated in the first direction and converts the first light to the light used by the display panel to display the image;
- a light diffusion member which is elongated in the first direction, in which is defined a plurality of first grooves respectively corresponding to the light source units, the light diffusion member diffusing the first light and providing the diffused first light to the light conversion member; and
- a light guide plate which guides the converted light from the light conversion member to the display panel, wherein
the light diffusion member is between the light conversion member and the light source in a second direction crossing the first direction,
the light conversion member faces a light incident side surface of the light guide plate,
the first grooves defined in the light diffusion member are each elongated in a third direction substantially perpendicular to the first and second directions, and
the light diffusion member comprises:
- a first extension part elongated in the first direction;
- second extension parts of which first ends thereof are respectively connected to first and second ends of the first extension part opposite to each other in the first direction, the second extension parts respectively elongated in the second direction from the first and second ends of the first extension part; and
- third extension parts of which first ends thereof are respectively connected to second ends of the second extension parts opposite to the first ends thereof in the second direction, the third extension parts respectively elongated in the first direction from the second ends of the second extension parts, distal second ends of the third extension parts opposite to the first ends thereof in the first direction disposed to face each other in the first direction.

14. The display apparatus of claim 13, wherein
the first grooves defined in the light diffusion member are recessed by a predetermined depth from a front surface of the first extension part, the front surface facing the light conversion member, toward a rear surface of the first extension part, the rear surface opposite to the front surface of the first extension part.

15. The display apparatus of claim 13, wherein a maximum length in the first direction of the third extension parts is smaller than a distance between a first groove closest to the first end of the first extension part among the first grooves defined in the light diffusion member and the first end of the first extension part and smaller than a distance between a first groove closest to the second end of the first extension part among the first grooves defined in the light diffusion member and the second end of the first extension part.

16. The display apparatus of claim 13, wherein
coupling grooves are defined at first and second ends of the light diffusion member by portions of the first extension part overlapping the third extension parts in the second direction, by the second extension parts and by the third extension parts, respectively, and
opposing ends of the light conversion member are respectively disposed in the coupling grooves defined at the first and second ends of the light diffusion member.

17. The display apparatus of claim 13, wherein the light diffusion member further comprises defined therein a second groove recessed by a predetermined depth from a rear surface of the first extension part toward a front surface of the first extension part and in which the light source units are disposed, the second groove elongated in the first direction recessed by the predetermined depth such that the first grooves defined in the light diffusion member do not meet the second groove defined in the light diffusion member.

18. The display apparatus of claim 13, wherein each of the first grooves defined in the light diffusion member comprises:
- a low point at a maximum distance from a front surface of the first extension part; and
- two inclination surfaces forming a predetermined inclination angle with respect to a plane of the front surface of the first extension part,
- the inclination surfaces extending from the low point to the front surface of the first extension part and form a first angle with respect to a first reference line, the first reference line defined as an imaginary line parallel to the second direction and passing through the low point.

19. The display apparatus of claim 18, wherein the first angle is about 30 degrees to about 75 degrees.

* * * * *